(12) United States Patent
Nagahara

(10) Patent No.: US 10,076,934 B2
(45) Date of Patent: Sep. 18, 2018

(54) CURED TREAD AND TIRE

(71) Applicant: BRIDGESTONE CORPORATION, Tokyo (JP)

(72) Inventor: Takeo Nagahara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 308 days.

(21) Appl. No.: 14/711,424

(22) Filed: May 13, 2015

(65) Prior Publication Data

US 2015/0283860 A1 Oct. 8, 2015

Related U.S. Application Data

(62) Division of application No. 14/113,281, filed as application No. PCT/JP2012/067675 on Jul. 11, 2012.

(30) Foreign Application Priority Data

Jul. 15, 2011 (JP) .................................. 2011-157094

(51) Int. Cl.
*B60C 11/00* (2006.01)
*B60C 11/02* (2006.01)
(Continued)

(52) U.S. Cl.
CPC .......... *B60C 11/0083* (2013.01); *B29D 30/56* (2013.01); *B60C 11/02* (2013.01);
(Continued)

(58) Field of Classification Search
CPC ..... B60C 11/0083; B60C 11/01; B60C 11/02; B60C 11/0332; B60C 2011/013; B60C 2011/033; B60C 11/00; B29D 30/56
(Continued)

(56) References Cited

U.S. PATENT DOCUMENTS 2,094,636 A 10/1937 Bull
3,753,821 A 8/1973 Ragen
(Continued)

FOREIGN PATENT DOCUMENTS

JP 03121905 A 5/1991
JP 5-16608 A 1/1993
(Continued)

OTHER PUBLICATIONS

Nov. 3, 2015 Office Action issued in U.S. Appl. No. 14/113,281.
(Continued)

*Primary Examiner* — Steven D Maki
*Assistant Examiner* — Philip N Schwartz
(74) *Attorney, Agent, or Firm* — Oliff PLC

(57) ABSTRACT

The invention provides a cured tread and a tire capable of controlling irregular wear of the tread. A base tire which is to be the base for the tire and a cured tread which is to be bonded to the base tire are molded separately, and they are integrated with each other to produce the tire. The tread is provided in its width (axial) direction with a plurality of grooves extending in its length (circumferential) direction. The thickness of the tread in a width cross section gradually decreases from the equator to the equator-side edge of the outermost groove located at an axially outermost position and gradually increases from the outer edge of the outermost groove outward in the axial direction.

13 Claims, 6 Drawing Sheets

(51) Int. Cl.
*B29D 30/56* (2006.01)
*B60C 11/03* (2006.01)
*B60C 11/01* (2006.01)

(52) U.S. Cl.
CPC ... *B60C 11/0332* (2013.01); *B60C 2011/0033* (2013.01); *B60C 2011/013* (2013.01)

(58) Field of Classification Search
USPC .............. 152/209.14, 209.16, 209.6; 156/96
See application file for complete search history.

(56) References Cited

U.S. PATENT DOCUMENTS

| 5,277,727 | A  | 1/1994  | Seiler et al. |
|-----------|----|---------|---------------|
| 2002/0195182 | A1 | 12/2002 | Naito |
| 2004/0007299 | A1 | 1/2004  | Dresch |

FOREIGN PATENT DOCUMENTS

| JP | 9-70903 A     | 3/1997  |
| JP | H11-151911 A  | 6/1999  |
| JP | 2001-039118 A | 2/2001  |
| JP | 2001-180228 A | 7/2001  |
| JP | 2005-112010 A | 4/2005  |
| JP | 2008-254596 A | 10/2008 |
| JP | 2008-296911 A | 12/2008 |

OTHER PUBLICATIONS

Jul. 15, 2016 Office Action issued in U.S. Appl. No. 14/113,281.
Jun. 18, 2015 Office Action issued in U.S. Appl. No. 14/113,281.
Sep. 23, 2014 Search Report issued in European Patent Application No. 12814666.9.
Oct. 9, 2012 Search Report issued in International Patent Application No. PCT/JP2012/067675.
Mar. 11, 2016 Office Action Issued in U.S. Appl. No. 14/113,281.
Oct. 3, 2017 Office Action Issued in U.S. Appl. No. 14/113,281.
Apr. 6, 2017 Office Action Issued in U.S. Appl. No. 14/113,281.

FIG.6(a)
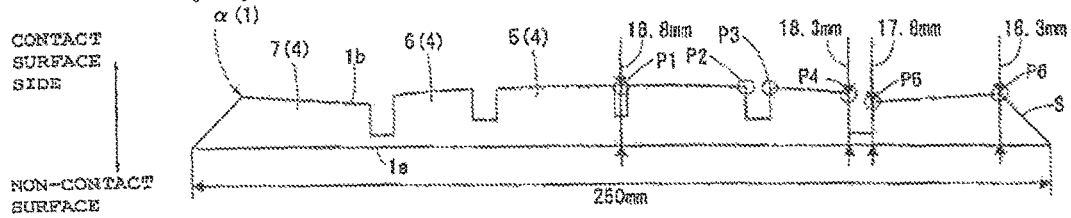
FIG.6(b) (Prior Art)
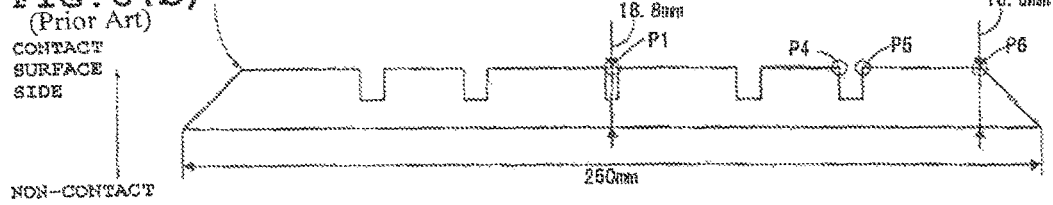
FIG.6(C)
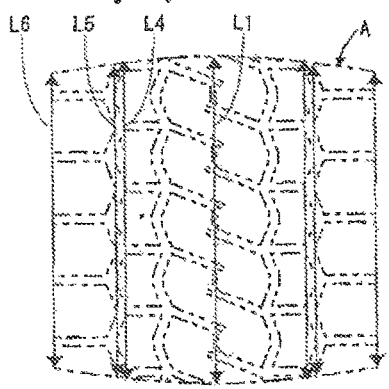
FIG.6(d) (Prior Art)
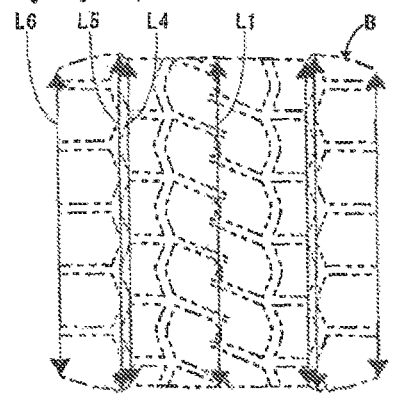
FIG.6(e)
| TIRE SIZE | | PERCENT OF CONTACT LENGTHS L4, L5, AND L6 AT EDGES P4, P5, AND P6 RELATIVE TO CONTACT LENGTH L1 AT CENTER P1 AS REFERENCE (100) IRREGULAR WEAR | | | | IRREGULAR WEAR |
|---|---|---|---|---|---|---|
| | | L1 | L4 | L5 | L6 | |
| 275/80R22.5 | TARGET VALUE | 100 | 98 | 95 | 90 | |
| | TREAD 1α OF PRESENT INVENTION | 100 | 98 | 95 | 90 | ABSENT |
| | CONVENTIONAL TREAD 10α | 100 | 99 | 102 | 93 | PRESENT |

FIG. 7 (a)
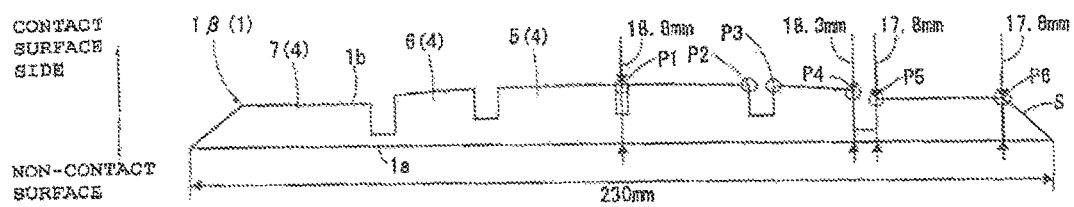
FIG. 7 (b) (Prior Art)
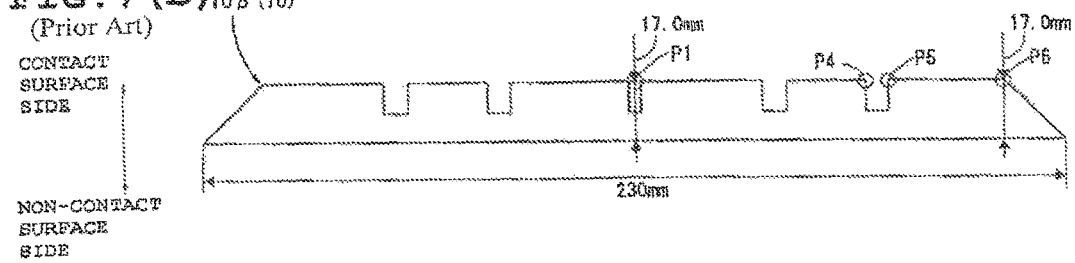
FIG. 7 (C)
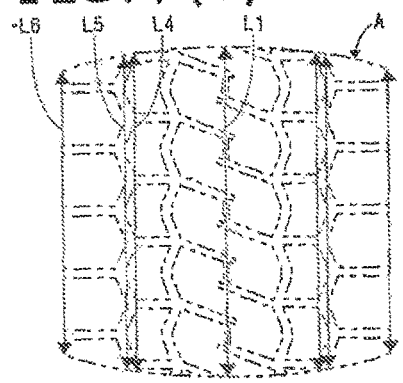
FIG. 7 (d) (Prior Art)
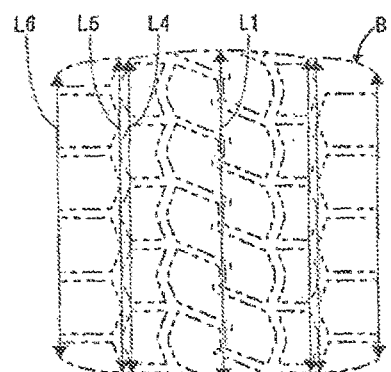
FIG. 7 (e)
| TIRE SIZE | | PERCENT OF CONTACT LENGTHS L4, L5, AND L6 AT EDGES P4, P5, AND P6 RELATIVE TO CONTACT LENGTH L1 AT CENTER P1 AS REFERENCE (100) IRREGULAR WEAR | | | | IRREGULAR WEAR |
|---|---|---|---|---|---|---|
| | | L1 | L4 | L5 | L6 | |
| 11R22.5 | TARGET VALUE | 100 | 97 | 90 | 74 | |
| | TREAD 1β OF PRESENT INVENTION | 100 | 97 | 90 | 74 | ABSENT |
| | CONVENTIONAL TREAD 10β | 100 | 95 | 95 | 84 | PRESENT |

CURED TREAD AND TIRE

This is a Division of application Ser. No. 14/113,281 filed Oct. 22, 2013, which in turn is a National Phase of International Patent Application No. PCT/JP2012/067675 filed Jul. 11, 2012, which claims priority to Japanese Patent Application No. 2011-157094 filed Jul. 15, 2011. The disclosure of the prior applications are hereby incorporated by reference herein in their entireties.

TECHNICAL FIELD

The present invention relates to a cured tread and, more particularly, to a cured tread capable of controlling the irregular wear of a tire produced by separately molding a base tire, which is to be the base for the tire, and a cured tread, which is to be bonded to the base tire, and integrating them together, and a tire having the cured tread thereon.

BACKGROUND ART

In one of known methods of tire manufacture, a base tire, which serves as the base for a tire, and a cured tread, which is to be bonded to the outer periphery of the base tire as the tread of the tire, are molded separately and then the base tire and the tread are integrated with each other into a product tire.

A base tire is obtained, for instance, by removing the tread portion of a used tire with a buffing machine. And the surface after the removal of the tread portion is formed as the bonding surface to which a new tread is bonded. The bonding surface is formed in such a way that the cutting part of a grinder is brought into contact with the tread portion of a used tire which is mounted fixedly to the drum of a buffing machine with the internal pressure applied. More specifically, the grinder is moved back and forth repeatedly in the width direction of the used tire while the drum is rotated. Thus the bonding surface is formed into a predetermined shape such that the curvature radius in the axial cross section of the bonding surface is smaller away from the tire axial center toward each side. Bonded to the base tire having the bonding surface of the predetermined shape is a cured tread which has been formed with a fixed thickness or with a thickness thinner away from the axial center toward each side. In this manner, a product tire is completed with these two parts integrated with each other.

PRIOR ART DOCUMENT

Patent Document

Patent Document 1: Japanese Unexamined Patent Application Publication No. 9-70903
Patent Document 2: Japanese Unexamined Patent Application Publication No. 2001-180228

SUMMARY OF THE INVENTION

Problem to be Solved by the Invention

However, as mentioned above, the bonding surface of the base tire is formed such that the curvature radius becomes smaller away from the axial center toward each side thereof. Therefore, if a cured tread having a fixed thickness or a cured tread thinner from the axial center toward each side thereof is bonded to the base tire, then the cured tread will bend in an arc in the axial direction. As a result, the grooves (main grooves) extending in the length (circumferential) direction in the cured tread get stretched in the axial direction such that there will be greater radius difference between the inner edge and the outer edge of each of the grooves.

Especially with the grooves located in outermost positions of the cured tread, the radius difference is greater than that at the edges of the other grooves. Consequently, the ground contact length will become longer than assumed at the time of tire design, and irregular wear will be more likely to occur in the axially outer areas of the tread on the product tire on the road. Also, in the forming of the bonding surface of a base tire, the tread portion of a used tire is buffed while the width of the bead portions is spread wider than the rim width of a wheel to which the tire is fitted. Therefore, depending on the aspect ratio of the used tire, there may be cases where the shape of the tread surface when the completed product tire is fitted to the wheel is further bent than the shape of the tread surface at the time of buffing. In such cases, the radius of the tread toward the axial sides tends to be smaller than the radius of the middle portion of the tread, and the ground contact length in the axial sides of the tread can become extremely shorter than that assumed at the time of tire design. Thus, this will raise the likelihood of irregular wear in the axially middle area of the cured tread when the product tire is on the road.

The present invention has been made to solve the above-described problems, and an object thereof is to provide a cured tread capable of controlling irregular wear of a tire having a cured tread bonded to the bonding surface of a base tire and a tire having such a cured tread applied thereto.

Means for Solving the Problem

To solve the above-described problems, a cured tread is so configured that it has in its width direction a plurality of grooves extending in its length direction. And the tread thickness in a width cross section gradually decreases from the equator to the equator-side edge of the outermost groove located at an axially outermost position and gradually increases from the outer edge of the outermost groove outward in the axial direction.

According to this configuration, the thickness in the axial cross section of a cured tread having in its axial direction a plurality of grooves extending in the circumferential direction of the tread gradually decreases from the equator to the equator-side edge of the outermost groove located at an axially outermost position and gradually increases from the outer edge of the outermost groove outward in the axial direction. Accordingly, it is possible to optimize the ground contact shape of the tread surface of a product tire having the cured tread thereon when it comes in contact with the road surface.

More specifically, the tread thickness in the axial cross section of the tread gradually decreases from the equator to the equator-side edge of the outermost groove located at an axially outermost position. As a result, the sectional shape along the tread surface of a product tire with the cured tread applied thereto will be a smooth curve when a proper internal pressure is applied therein. Also, the tread thickness in the axial cross section of the tread gradually increases from the outer edge of the outermost groove outward in the axial direction. As a result, it is possible to prevent the noncontact with the road surface of the part of the tread outside of the outermost groove in the axial direction. Thus the irregular wear of the tread can be controlled because the tread surface of a product tire can be brought into contact with the road surface in a well-balanced manner.

Also, another cured tread is so configured that it has in its width (axial) direction a plurality of grooves extending in its length (circumferential) direction. And the tread thickness in a width cross section gradually decreases from the equator to the equator-side edge of the outermost groove located at an axially outermost position and is fixed from the outer edge of the outermost groove outward in the axial direction.

According to this configuration, the thickness in the axial cross section of a cured tread having in its axial direction a plurality of grooves extending in the circumferential direction of the tread gradually decreases from the equator to the equator-side edge of the outermost groove located at an axially outermost position and is fixed from the outer edge of the outermost groove outward in the axial direction. Accordingly, it is possible to optimize the ground contact shape of the tread surface of a product tire having the cured tread applied thereto when it comes in contact with the road surface.

More specifically, the tread thickness in the axial cross section of the tread gradually decreases from the equator to the equator-side edge of the outermost groove located at an axially outermost position. As a result, the sectional shape along the tread surface of a product tire with the cured tread applied thereto will be a smooth curve when a proper internal pressure is applied therein. Also, the tread thickness in the axial cross section is fixed from the outer edge of the outermost groove outward in the axial direction. As a result, it is possible to prevent the excessive contact of the axially outermost portion of the tread surface with the road surface. For example, a product tire with a tread applied to a base tire which has a lower aspect ratio shows a smaller change in the radius at the outer edge of the axially outermost groove, when the internal pressure is applied, than a product tire with a tread applied to a base tire which has a higher aspect ratio. Therefore, the tread thickness in the axial cross section from the outer edge of the outermost groove outward in the axial direction being fixed will prevent an excessive contact or noncontact of the outer edge of the outermost groove with the road surface. Thus, it is possible to control the irregular wear of the tread because the tread surface of the product tire comes in contact with the road surface in a well-balanced manner.

Also, another cured tread is so configured that the tread thickness in the width cross section at an axially outermost side is thinner than the thickness of the cross section at the equator.

According to this configuration, the tread thickness in the axial cross section of the tread at an axially outermost side is thinner than the sectional thickness at the equator. As a result, the ground contact length at the equator along the tire circumference will be the longest when a product tire comes in contact with the road surface. Accordingly, the tread of the product tire in contact with the road surface will have an ideal ground contact shape. That is, without the tread scratching against the road surface, the rolling resistance will be smaller and irregular wear will not occur on the tread.

Also, another cured tread is so configured that the tread thickness in the width cross section at the equator-side edge of the outermost groove is thicker than the tread thickness at the outer edge of the outermost groove.

According to this configuration, the tread thickness at the equator-side edge of the outermost groove is thicker than that at the outer edge of the outermost groove. This will provide an edge effect in the axially outer area of the tread, thereby improving cornering and stability.

Also, another cured tread is so configured that the tread thickness in the width cross section at the equator-side edge of the outermost groove is equal to the tread thickness at the axially outermost side of the tread.

According to this configuration, the tread thickness at the equator-side edge of the outermost groove is equal to the tread thickness at the axially outermost side of the tread. Hence, it is possible to prevent the excessive contact of the axially outermost side of the cured tread when the product tire comes in contact with the road surface.

Also, another cured tread is so configured that the tread thickness in the width cross section gradually decreases in a curve from the equator to the equator-side edge of the outermost groove located at an axially outermost position.

According to this configuration, a tire featuring the performance assumed at tire design and low rolling resistance causing no irregular wear can be produced.

Also, to solve the previously described problems, a tire is so configured that it has thereon any one of the cured treads described above.

According to this configuration, the tread surface of the product tire can be brought into contact with the road surface in a well-balanced manner, and so irregular wear of the tread of the tire can be controlled.

BRIEF DESCRIPTION OF THE DRAWINGS

FIG. 6A illustrates a sectional shape of a cure-molded tread.

FIG. 6B illustrates a sectional shape of a conventional tread 10 of a flat plate type having a fixed sectional thickness.

FIG. 6C illustrates a ground contact shape of a product tire having a tread.

FIG. 6D illustrates a ground contact shape of a tire having a conventional tread.

FIG. 6E provides a table showing the differences in the lengths of the ground contact shapes of FIG. 6C and FIG. 6D FIG. 7A illustrates a sectional shape of a cure-molded tread.

FIG. 7B illustrates a sectional shape of a conventional tread.

FIG. 7C illustrates a ground contact shape of a product tire having a tread.

FIG. 7D illustrates a ground contact shape of a tire having a conventional tread.

FIG. 7E provides a table showing the differences in the lengths of the ground contact shapes of FIG. 7C and FIG. 7D.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Figure 1A:
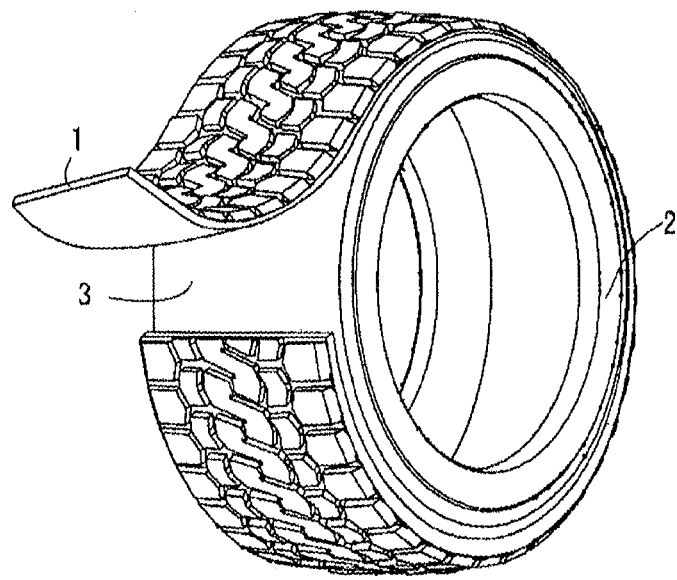
FIG. 1A is a perspective illustration of a tire with its tread bonded to the base tire.
Figure 1B:
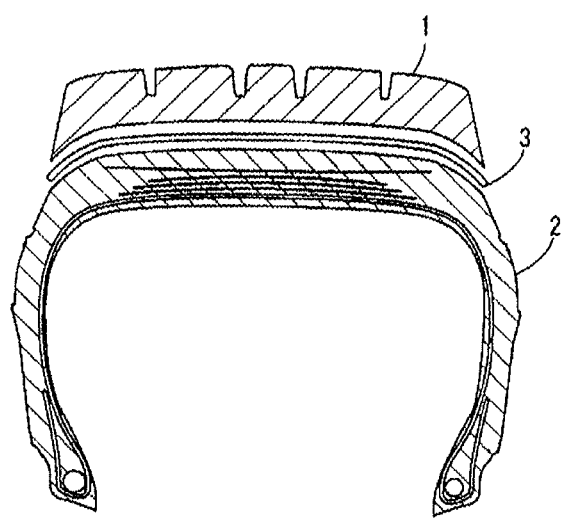
FIG. 1B illustrates an exploded view of a tire with its tread bonded to the base tire.
Figure 2A:
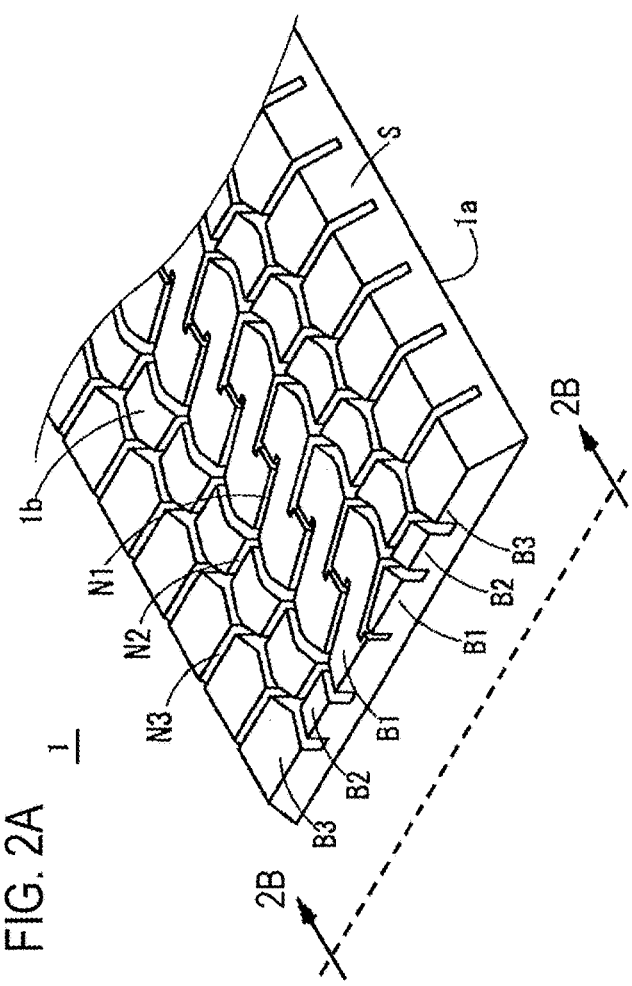
FIG. 2A is an appearance perspective illustration of a tread.
Figure 2B:
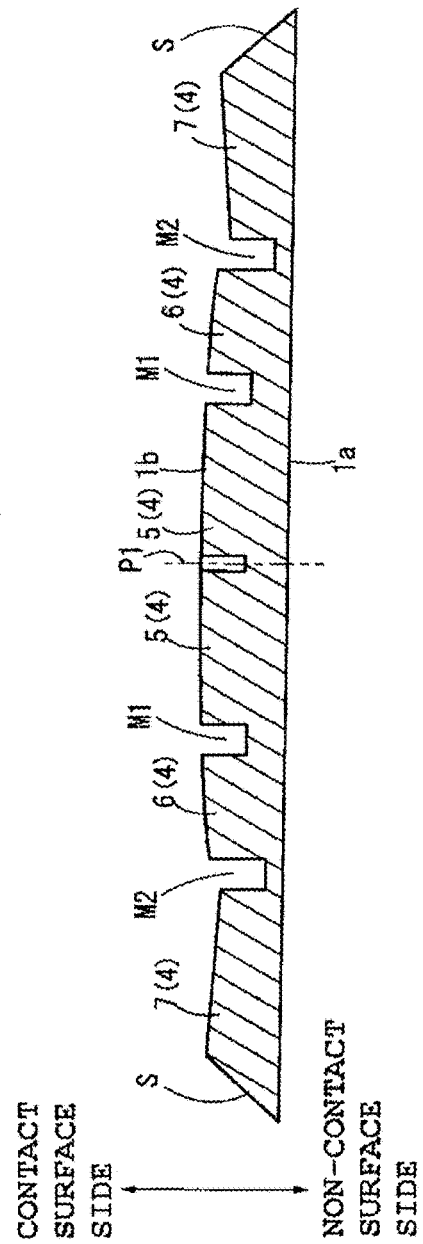
FIG. 2B illustrates a cross-sectional view in an axial direction of a tread.
Figure 3:
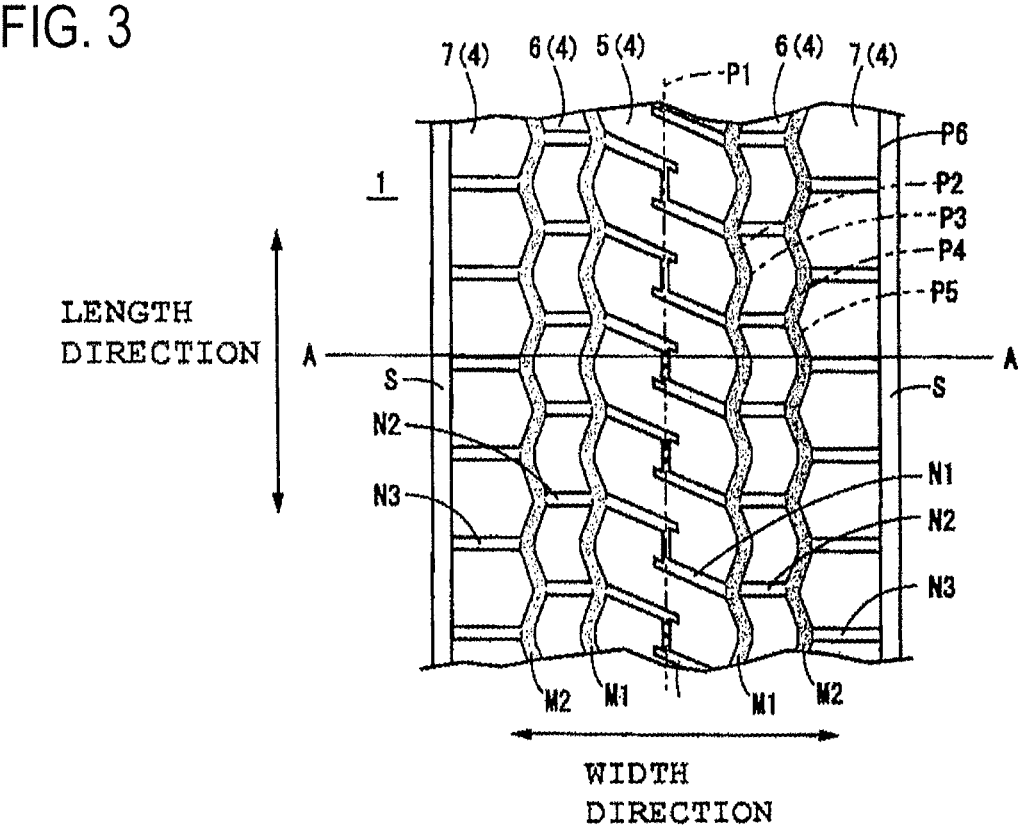
FIG. 3 is a plan view of a tread.

FIG. 1A is an exploded perspective view of a product tire constructed by bonding a tread 1 according to the present invention to a base tire 2. FIG. 1B is a cross-sectional view of a product tire with the tread 1 bonded to the base tire 2 through the medium of a bonding layer 3. FIG. 2 is an appearance perspective illustration of a tread 1 and a cross-sectional view thereof in a width (axial) direction. FIG. 3 is a plan view of a tread 1.

As shown in FIGS. 1A and 1B, a tread 1 according to the present invention is bonded through the medium of a bonding layer 3 formed on the outer periphery of a base tire 2. As shown in FIG. 2, the tread 1 is a tread cure-molded into a strip shape of predetermined dimensions. The sectional shape of the tread 1 in the width direction is approximately trapezoidal with the non-contact surface 1a side to be bonded to the base tire 2 formed in a linear fashion and the contact surface 1b side to contact with the road surface formed in a wavelike fashion.

Formed in the contact surface 1b of the tread 1 are a plurality of main grooves M1 and M2 extending along the length direction when the tread 1 is bonded to the base tire 2 and axial grooves N1, N2, N3 axially connecting the adjacent main grooves M1 and M2 with each other or the main grooves M1 and M1 with each other.

The main grooves M1 are located closer to the equator which is the axial center of the tread, whereas the main grooves M2 are the outermost grooves located axially outside of the main grooves M1. Formed on the groove bottoms of the main grooves M1 and M2 are wear indicators indicating the wear limits of the tread 1 (see JIS D 4230), for instance.

The axial grooves N1, N2, N3, which have, for instance, the same depth as the main grooves M1 and M2, are formed at regular or irregular intervals along the length direction of the tread. The contact surface 1b of the tread 1 in the present embodiment is comparted into blocks by a plurality of the main grooves M1 and M2 and a plurality of axial grooves N1, N2, N3.

As shown in FIG. 2 and FIG. 3, in the contact surface 1b which is the side of the tread coming in contact with the road surface, the axial grooves N1 connecting the main groves M1, M1 with each other are formed at regular or irregular intervals along the circumferential direction of the tread. As a result, center blocks 5 defined by the axial grooves N1, N1 are formed in the axially middle area of the tread 1. Also, in the contact surface 1b, the axial grooves N2 connecting the main groves Ml with the main grooves M2 are formed at regular or irregular intervals along the circumferential direction of the tread. As a result, side blocks 6 defined by the axial grooves N2, N2 are formed on the axially outward side of the center blocks 5.

Also, in the contact surface 1b, the axial grooves N3 connecting the main groves M2 with the tread side surface S (hereinafter referred to as side surface S) are formed at regular or irregular intervals along the circumferential direction of the tread. As a result, shoulder blocks 7 defined by the axial grooves N3, N3 are formed on the axially outward side of the side blocks 6.

Figure 4:
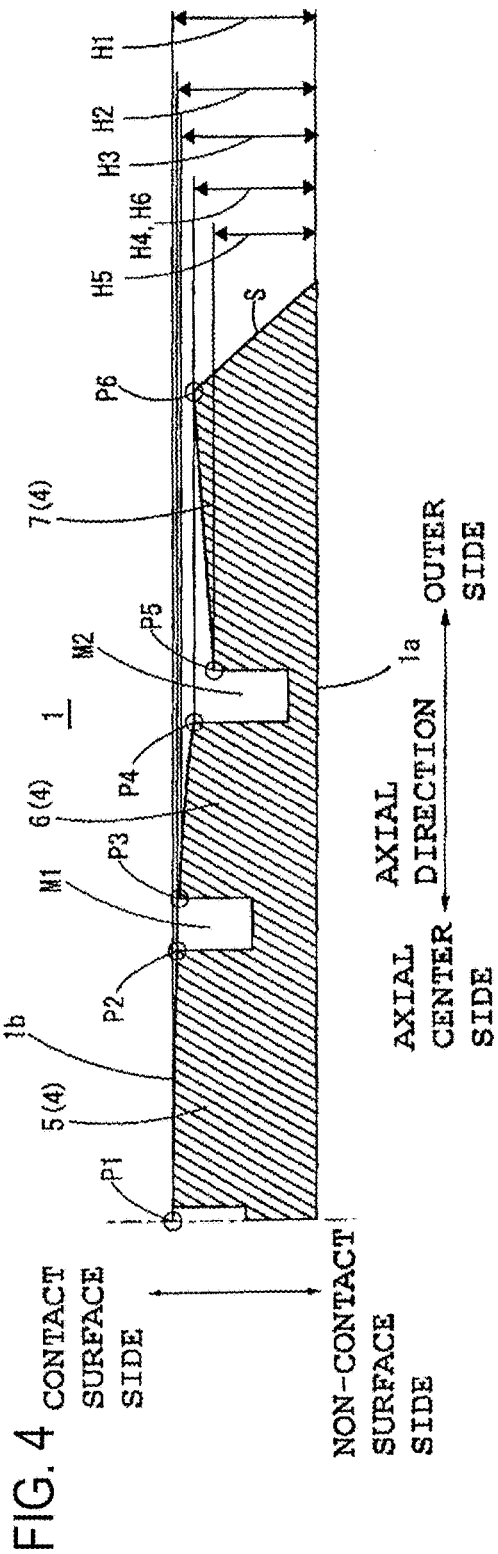
FIG. 4 is an enlarged view of a cross section of a tread.

In the present embodiment, the tread pattern is described as being symmetrical with respect to the equator P1, which is the tread width center as shown in FIG. 3 and FIG. 4 (hereinafter referred to as the axial center P1), for simplicity. However, an actual tread pattern is not limited to this description of the embodiment.

FIG. 4 is an enlarged view of an axial cross section of a tread 1 taken along line A-A of FIG. 3 . Hereinbelow, a description is given of the thickness in the axial direction of a tread 1 having tread blocks 5, 6, and 7 with reference to FIG. 3 and FIG. 4.

As shown in FIG. 3 and FIG. 4, the center blocks 5 are located in the axially middle area of the tread 1, straddling the axial center P1 in the axial direction.

The thickness H2 from the non-contact surface 1a to the contact surface 1b at the axial center P1 side edge P2 of the main groove M1 defining the center blocks 5 and the side blocks 6 is set thinner than the thickness H1 from the non-contact surface 1a to the contact surface 1b at the tread center P1. The edge P2 is the equator-side edge of the main groove M1 opening on the contact surface 1b.

Also, the thickness H3 from the non-contact surface 1a to the contact surface 1b at the axially outer edge P3 of the main groove M1 is formed even thinner than the thickness H2 at the above-mentioned edge P2. The edge P3 is the outer edge of the main groove M1 opening on the contact surface 1b.

The thickness H4 from the non-contact surface 1a to the contact surface 1b at the axial center P1 side edge P4 of the main groove M2 defining the side blocks 6 and the shoulder blocks 7 is formed even thinner than the thickness H3 at the above-mentioned edge P3. The edge P4 is the equator-side edge of the main groove M2 opening on the contact surface 1b.

In other words, the tread 1 according to the present embodiment is formed such that in the axial cross section the thickness H1 at the axial center P1 is the thickest and the thickness becomes gradually thinner in the order of the edges P2, P3, and P4. More specifically, from the axial center P1 to the axial center P1 side edge P4 of the main groove M2 located in an outermost position, the sectional thickness of the tread 1 is so formed as to gradually decrease in the axial direction.

Thus the thickness of the tread 1 is so formed as to gradually decrease from the axial center P1 to the edge P4. As a result, when the tread 1 is bonded in a curve along the width of the curved bonding surface of the base tire 2, the virtual line connecting the edges P2, p3, and P4 of the tread blocks 4 will be a smooth line declining monotonically from the axial center P1 to the edge P4. More specifically, with the tread 1 bonded to the bonding surface, the edge P2 and the edge P3 of the main grooves M1 are displaced in the radial direction while moving away from each other due to the axial curvature of the bonding surface. Yet, the surface from the axial center P1 to P3 is smooth without the edge P2 and the edge P3 sticking out because the thickness of the tread 1 decreases progressively and smoothly from the edge P2 to the edge P3. And, with the thickness gradually decreasing from the axial center P1 to the edge P2 of the center blocks 5 and from the edge P3 to the edge P4 of the side blocks, the tread surface of a product tire having the tread 1 thereon will take a form such that the tread surface smoothly and gradually decline from the axial center P1 to the edge P4.

It is to be noted that the sectional shape line connecting the axial center P1 and the edges P2, P3, and P4 is preferably a smooth curve approximating the buff line, for instance. But the shape of the line may be such that the line extends in a step-by-step or linear manner within each of the blocks. Also, the declining rate of the thickness may also be set arbitrarily.

Next, a description is given of the sectional thickness of the tread axially outside of the edge P4.

The thickness H5 from the non-contact surface 1a to the contact surface 1b at the edge P5 axially outside of the main groove M2 is formed even thinner than, for example, the thickness H4 at the above-mentioned edge P4. The edge P5 is the axially outer edge of the main groove M2 opening on the contact surface 1b. The thickness H6 from the non-contact surface 1a to the contact surface 1b at the edge P6 on the contact surface 1b side of the tread side surface S of the tread 1 is so formed as to be thicker than the thickness H at the edge P5. The edge P6 is the axially outermost edge of the contact surface 1b where the contact surface 1b meets the tread side surface S. That is, the edge P6 is the axially outermost edge of the ground contact area of the tread 1.

More specifically, the thickness H5 at the edge P5 on the axially outer side of the main groove M2 is formed even thinner than the thickness H4 at the edge P4, and the sectional thickness is gradually increased from the edge P5 to the axially outermost edge P6 such that the thickness H6 at the edge P6 is equal to the thickness H4 at the edge P4.

In other words, the sectional thickness is gradually increased from the edge P5 in such a manner that the thickness H6 at the edge P6 is the same as the thickness H4 at the edge P4. Also, the line connecting the edge P5 with the edge P6 in the sectional shape is set as a straight line, for instance.

As described above, the thickness H5 at the outer edge P5 of the main groove M2 is formed even thinner than the thickness H4 at the edge P4. As a result, when the tread 1 is bonded along the curvature of the bonding surface, the surface from the axial center P1 to the edge P5 is formed in a smooth curve without the edge P4 and the edge P5 of the main groove M2 sticking out.

Also, the tread 1 is formed such that the thickness increases gradually from the outer edge P5 of the main groove M2 located at an axially outermost position to the edge P6 which is the axially outermost edge thereof. As a result, the tread 1 can be bonded to the bonding surface in an optimal curve from the edge P5 to the edge P6 when it is bonded along the curve of the shoulder area of the base tire 2 where the change in curvature is marked. That is, the gradual increase in the thickness from the edge P5 to the edge p6 can reduce the difference in radius between the edge P5 and the edge p6 which may likely occur on a product tire due to the marked change in curvature of the bonding surface in the shoulder area of the base tire 2. Also, when the tread 1 is bonded to the bonding surface, the thickness H6 at the edge P6 being formed equal to the thickness H4 at the edge P4 will ensure that the surface from the edge P4 to the edge P6 via the edge P5 is formed in a smooth curve. This will prevent an excessive contact of the edge P6, which is the axially outermost edge of the contact surface 1b of the cured tread, when the product tire having the tread 1 on comes in contact with the road surface.

The tread 1 is formed such that, while maintaining the above-described relationship of thicknesses in the axial direction, the sectional thickness at any given axial position is fixed in the circumferential direction thereof. That is, when the tread 1 is axially cut at any given circumferential position, the shape of the contact surface 1b remains the same.

Figure 5:
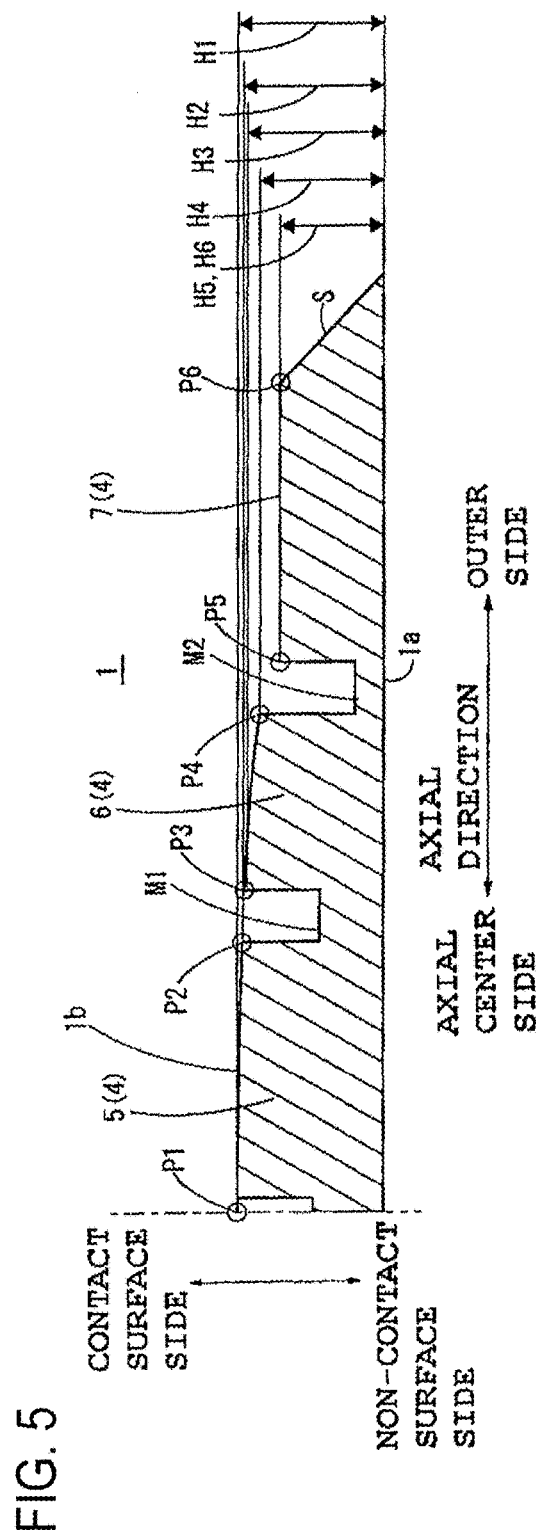
FIG. 5 is a cross-sectional view of another shape of a tread.

FIG. 5 is a cross-sectional view showing another shape of the tread 1. In the foregoing embodiment, the sectional thickness of the tread 1 is so formed as to gradually increase from the edge P5 to the edge P6. However, the present embodiment differs in that the sectional thickness is fixed from the edge P5 to the edge P6.

As shown in FIG. 5, the tread 1 in this embodiment is formed with the sectional thicknesses in the axial direction as follows. The thickness H1 at the axial center P1 is the thickest, and then the thickness is formed gradually thinner from the edge P2 to the edge P3 to the edge P4. And the thickness H5 at the edge P5 is formed even thinner than the thickness H4 at the edge P4, and the thickness H6 is formed fixed from the edge P5 to the edge P6 which is the axially outermost edge. That is, the sectional shape from P5 to P6 is formed in a straight line.

According to the present embodiment, the thickness of the tread 1 from the edge P5, which is the edge on the tread side surface S side of the main groove M2 located at an axially outermost position, to the edge P6 is so formed as to be fixed. As a result, when it is used for a base tire 2 with a lower aspect ratio, the tread 1 can be bonded to the bonding surface in an optimal curve from the edge P5 to the edge P6 along the curve of the shoulder area of the base tire 2 where the change in curvature is marked. In other words, a base tire 2 with a lower aspect ratio shows a smaller change in the curvature of the bonding surface in the shoulder area, which is located in the axially outermost position, when the internal pressure is applied, than a base tire 2 with a higher aspect ratio. Therefore, the thickness from the edge P5 to the edge P6 being fixed will create a smooth curve from the edge P5 to the edge P6 when a product tire is manufactured by applying a tread 1 to a base tire 2 with a lower aspect ratio. This will prevent an excessive contact of the edge P6, which is the axially outermost edge of the tread 1 when the product tire comes in contact with the road surface. Thus, the tire having the tread 1 of this embodiment bonded thereto can control the irregular wear of the tread 1 because the contact surface 1b thereof comes in contact with the road surface in a well-balanced manner.

The tread 1 in each of the foregoing embodiments is molded with a press-type curing machine, for instance.

Although not shown, the curing machine is equipped with a contact surface side mold for molding the contact surface 1b side of the tread 1 and a non-contact surface side mold for molding the non-contact surface 1a side thereof. The machine can receive a tread material shaped, beforehand in a strip (band) into the molding space defined by the two molds and heat it under a predetermined pressure.

The surface of the contact surface side mold is formed with a pattern of raised and recessed portions which is the inversion of the tread pattern on the tread 1. Thus, a tread 1 having a desired tread pattern can be produced when a surface of the tread material is pressed against the surface of the contact surface side mold. On the other hand, the surface of the non-contact surface side mold is formed as a flat surface. Accordingly, the surface of the tread material facing the flat surface will be formed as the non-contact surface of the tread 1.

Hereinbelow, an outline will be given of a manufacturing process of a product tire in which a tread 1 having sectional thicknesses as described above is bonded to a base tire 2. A base tire 2 as shown in FIG. 1 can be obtained, for instance, by removing the tread portion of a used tire with a not-shown buffing machine. Although not shown, the buffing machine is equipped with a drum that can hold a used tire with an internal pressure applied and a grinder located in opposition to the drum and having a cutting part capable of cutting the tread portion of the used tire while it is rotated by the drum. The drum, which is a cylindrical body consisting of a plurality of drum pieces attached expandably and contractably, can fixedly hold a used tire of differing sizes. Also, the drum has flanges along the outer periphery which are axially spaced apart at a given distance. The flanges, which correspond to the rim flanges of a wheel, secure a pair of bead portions tightly thereon when an internal pressure is applied to the used tire.

The grinder is installed in such a manner that it can move closer to or away from and axially along the used tire held by the drum. And the grinder is brought closer to the tread portion of the rotating used tire and the tread portion is removed gradually by moving the cutting part of the grinder in contact with the tread portion in the axial direction. In this way, a base tire 2 having a bonding surface of a predetermined shape (buff line) can be produced.

A bonding layer 3 is placed on the bonding surface along the circumference of the base tire 2 formed through the above-described process. The bonding layer 3, which is an uncured gum called cushion gum, is formed by extruding the gum material into a uniform thickness onto the bonding surface using an extrusion-molding machine, for instance.

Now the above-described tread 1 is wound circumferentially around the bonding surface of the base tire 2 having the bonding layer placed thereon.

That is, the tread 1 is provisionally integrated with the base tire 2 through the medium of the bonding layer 3. Next, the tread 1 and the base tire 2 provisionally integrated with each other are placed in a sealed bag called an envelope.

The envelope has a valve through which the air inside can be expelled. After the tread 1 and the base tire 2 are placed inside the envelope, the air inside is expelled through the valve so as to bring the the envelope into close contact with the surfaces of the tread 1 and the base tire 2. Then the tread 1 and the base tire 2 compressed by the envelope are carried into a curing unit called a curing can. Inside the curing unit, the cushion gum as the bonding layer between the tread 1 and the base tire 2 will bond the tread 1 and the base tire 2 firmly together as curing progresses under a predetermined pressure and temperature for a given period of time. In this manner, the manufacture of a product tire is completed.

EXAMPLE 1

FIG. 6A shows a sectional shape of a cure-molded tread according to the present invention. FIG. 6B shows a sectional shape of a conventional tread 10 of a flat plate type having a fixed sectional thickness. FIG. 6C shows a ground contact shape of a product tire having a tread 1 according to this invention applied thereto. FIG. 6D shows a ground contact shape of a tire having a conventional tread 10 applied thereto. FIG. 6E is a table showing the differences in the lengths of the ground contact shapes of FIG. 6C and FIG. 6D. It is to be noted that in the table, the ground contact lengths L4 to L6 at the edges P4 to P6, respectively, are represented by the percentages to the ground contact length L1 at the tread center P1 along the circumference of the tire as reference (100).

In Example 1, a comparative testing was conducted by preparing base tires 2 by buffing used tires of 275/80R22.5 and manufacturing test product tires applying a tread 1 of the present invention on one base tire 2 and a cure-molded tread 10 on the other base tire 2 as a comparative example.

As shown in FIG. 6A, the tread 1α(1) in Example 1 was formed such that the width thereof on the non-contact surface 1a side was 250 mm. The thickness H1 thereof at the axial center P1 was 18.8 mm, the thickness H4 at the edge P4 was 18.3 mm, the thickness H5 at the edge P5 was 17.8 mm, and the thickness H6 at the edge P6 was 18.3 mm. The sectional thickness from the axial center P1 to the edge P4 gradually decreased in a curve. The sectional thickness at the edge P5 was set thinner than that at the edge P4. The sectional thickness at the edge P6 was set equal to that at the edge P4. And the sectional thickness from the edge P5 to the edge P6 gradually increased in a linear manner.

As shown in FIG. 6B, the tread 10α(10), which was a comparative example, was formed as a flat plate whose thickness was fixed at 18.8 mm from the axial center P1 to the edge P6.

Hereinbelow, a description is given of a tire with a tread 1a bonded thereto as product tire A and a tire with a tread 10α bonded thereto as product tire B.

As shown in FIG. 6C, FIG. 6D, and FIG. 6E, it is evident that product tire A meets the target shape (ground contact lengths) assumed at tire design. That is, product tire A having a desired ground contact shape can be manufactured by molding the tread 1α such that the sectional thickness of the tread 1α gradually decreases from the axial center P1 to the axial center P1 side edge P4 of the main groove M2 located at an axially outermost position and gradually increases from the outer edge P5 of the main groove M2 to the axial side thereof. And no irregular wear was observed on product tire A because the contact surface 1b was in a desired shape especially in the area axially outside of the main groove M2 where the diameter change is the greatest when the internal pressure is applied. Thus, product tire A having the tread 1α of the present invention applied thereto is a tire featuring the performance intended at tire design and low rolling resistance without irregular wear.

On the other hand, product tire B tends to have generally longer ground contact lengths than the target lengths assumed at tire design. In particular, the ground contact length L5 at the edge P5 is longer than the ground contact length L1 at the axial center P1. That is, product tire B having the tread 10α bonded thereto turned out to have irregular wear at the edge P5 portion without having a uniform wear on the entire tire tread because the edge P5 was locally pushed hard against the road surface. The irregular wear of this type can be a factor in increasing the rolling resistance, which will cause instability in steering the vehicle.

EXAMPLE 2

FIG. 7A shows a sectional shape of a cure-molded tread 1 according to the present invention. FIG. 7B shows a sectional shape of a conventional tread 10 of a flat plate type having a fixed sectional thickness. FIG. 7C shows a ground contact shape of a product tire having a tread 1 according to this invention applied thereto. FIG. 7D shows a ground contact shape of a tire having a conventional tread 10 applied thereto. FIG. 7E is a table showing the differences in the lengths of the ground contact shapes of FIG. 7C and FIG. 7D. It is to be noted that in the table, the ground contact lengths L4 to L6 at the edges P4 to P6, respectively, are represented by the percentages to the ground contact length L1 at the tread center P1 along the circumference of the tire as reference (100).

In Example 2, a comparative testing was conducted by preparing base tires 2 by buffing used tires of 11R22.5, a tire size different from that of Example 1, and manufacturing test product tires applying a tread 1 of the present invention on one base tire 2 and a cure-molded tread 10 on the other base tire 2 as a comparative example.

As shown in FIG. 7A, the tread 1β(1) in Example 2 was formed such that the width thereof on the non-contact surface 1a side was 230 mm. The thickness H1 thereof at the tread center P1 was 18.8 mm, the thickness H4 at the edge P4 was 18.3 mm, the thickness H5 at the edge P5 was 17.8 mm, and the thickness H6 at the edge P6 was 17.8 mm. The sectional thickness from the axial center P1 to the edge P4 gradually decreased in a curve. The sectional thickness at the edge P5 was set thinner than that at the edge P4. The sectional thickness at the edge P6 was set equal to that at the edge P4. And the sectional thickness from the edge P5 to the edge P6 was so formed as to be fixed.

As shown in FIG. 7B, the tread 10β(10), which was a comparative example, was formed as a flat plate whose thickness was fixed at 18.8 mm from the axial center P1 to the edge P6.

Hereinbelow, a description is given of a tire with a tread 1β bonded thereto as product tire A and a tire with a tread 10β bonded thereto as product tire B.

As shown in FIG. 7C, FIG. 7D, and FIG. 7E, it is evident that product tire A meets the target shape (ground contact lengths) assumed at tire design. That is, product tire A having a desired ground contact shape can be manufactured by molding the tread 4 such that the sectional thickness of the tread 4 gradually decreases from the axial center P1 to the axial center P1 side edge P4 of the main groove M2 located at an axially outermost position and is fixed from the outer edge P5 of the main groove M2 to the edge P6, which is the axially outermost edge. The product tire A of this Example, in particular, has a high aspect ratio in comparison with the product tire A of Example 1. Therefore, the product tire A of this Example, formed to have a fixed thickness from the outer edge P5 of the main groove M2 to the axial side, showed no irregular wear because the contact surface 1b took a desired shape in the area axially outside of the main groove M2 subject to the greatest tire diameter change when the internal pressure is applied. Accordingly, product tire A having the tread 1β of the present invention applied thereto is a tire featuring the performance intended at tire design and low rolling resistance without irregular wear.

On the other hand, product tire B, which has a higher aspect ratio than that of the product tire B of Example 1, tends to have longer ground contact lengths in the axially outer area of the tread 10β than the target lengths assumed at tire design. In particular, the ground contact length L6 at the edge P6 is much longer than the target length. That is, product tire B having the tread 10β bonded thereto turned out to have irregular wear especially at the edge P6 without having a uniform wear on the entire tire tread because the shoulder blocks 7 were pushed hard against the road surface. The irregular wear of this type can be a factor in increasing the rolling resistance, which will cause instability in steering the vehicle.

As hereinbefore described, irregular wear of the tread 1 on a product tire can be prevented by employing the sectional thickness of the tread 1β gradually decreasing from the axial center P1 to the axial center P1 side edge P4 of the main groove M2 located at an axially outermost position and gradually increasing or being fixed from the outer edge P5 of the main groove M2 to the edge P6, which is the axially outermost edge, depending on the aspect ratio of the tire. That is, when the aspect ratio of the base tire is low, the thickness H6 from the outer edge P5 of the main groove M2 to the edge P6, which is the axially outermost edge, is gradually increased. And when the aspect ratio of the base tire is low, the thickness H6 from the outer edge P5 of the main groove M2 to the edge P6, which is the axially outermost edge, is fixed. In this manner, it is possible to prevent irregular wear of the tread 1β.

Also, the thickness H5 at the edge P5 may be set equal to or thicker than the thickness H4 at the edge P4 as appropriate. This will provide an edge effect in the axially outer area, or the tire shoulder area, thereby improving the cornering performance and stability of the vehicle.

In the foregoing embodiments, the tread 1 has been described as being formed in a strip (band) shape. Yet the tread 1 is not limited to a strip shape, but may be an annular tread which has been cure-molded into a ring shape in advance.

Also, in the foregoing embodiments, the base tire has been described as one formed by buffing the worn tread portion of a used tire. But the base tire may be a newly produced base tire cure-molded and then formed by buffing the crown portion thereof.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS 1, 1α, 1β tread
1a non-contact surface
1b contact surface
2 base tire
3 bonding layer
4 tread block
5 center block
6 side block
7 shoulder block
H1-H6 thickness
L1, L4, L5, L6 ground contact length
M1, M2 main groove
N1, N2, N3 axial groove
P1 tread center
P2-P6 edge

The invention claimed is:

1. In combination, a cured tread and a curved bonding surface of a base tire, the curved bonding surface having a predetermined curved shape with a curvature radius in an axial cross-section of the curved bonding surface that is smaller away from an axial center than at the axial center, the cured tread being configured to be bonded to the curved bonding surface of the base tire, the cured tread having a first configuration prior to being bonded to the curved bonding surface and having a second configuration after being bonded to a curved bonding surface of the base tire, the cured tread comprising:

a non-contact surface having a linear profile in a width direction thereof; and a contact surface having a contoured profile in the width direction, the contact surface including a plurality of grooves extending in a length direction thereof, wherein, in the first configuration, tread thickness between the non-contact surface and the contact surface in a width cross section gradually decreases from an equator to an equator-side edge of an outermost groove located at an outermost position in the width direction and is fixed from an outer edge of the outermost groove outward in the width direction, wherein, in the second configuration, (i) the non-contact surface is bonded along the curved bonding surface, (ii) a virtual line extending from the equator to the equator-side edge of the outermost groove declines monotonically, and (iii) the contact surface side of the cured tread extends in a smooth curve from the equator to the equator-side edge of the outermost groove to the axially outermost edge of the cured tread, and wherein the tread thickness in the width cross section at the equator-side edge of the outermost groove is equal to the tread thickness at the outermost side of the tread.

2. The cured tread and curved bonding surface according to claim 1, wherein, in the first configuration, the tread thickness in the width cross section at an outermost side is thinner than the thickness of the width cross section at the equator.

3. The cured tread and curved bonding surface according to claim 1, wherein, in the first configuration, the tread thickness in the width cross section at the equator-side edge of the outermost groove is equal to the tread thickness at the outermost side of the tread.

4. The cured tread and curved bonding surface according to claim 1, wherein, in the first configuration, the tread thickness in the width cross section at the equator-side edge of the outermost groove is thicker than the tread thickness at the outer edge of the outermost groove.

5. The cured tread and curved bonding surface according to claim 1, wherein, in the first configuration, the tread thickness in the width cross section gradually decreases in a curve from the equator to the equator-side edge of the outermost groove located at an outermost position in the width direction.

6. The cured tread and curved bonding surface according to claim 1, wherein, in the second configuration, a ground contact length of the contact surface is greater at the equator than at the equator-side edge and the axially outermost edge.

7. A tire having thereon the cured tread and the curved bonding surface as recited in claim 1.

8. A tire comprising:
a base tire having a curved bonding surface, the curved bonding surface having a predetermined curved shape with a curvature radius in an axial cross-section of the curved bonding surface that is smaller away from an axial center of the curved bonding surface than at the axial center; and
a cured tread configured to be bonded to the base tire, the cured tread including:
a non-contact surface having a linear profile in a width direction thereof; and
a contact surface having a contoured profile in the width direction, the contact surface including a plurality of grooves extending in a length direction thereof,
wherein the cured tread has a first configuration prior to being bonded to the base tire and a second configuration after being bonded to the curved bonding surface of the base tire,
wherein, in the first configuration, tread thickness between the non-contact surface and the contact surface in a width cross section gradually decreases from an equator to an equator-side edge of an outermost groove located at an outermost position in the width direction and is fixed from an outer edge of the outermost groove outward in the width direction, and
wherein, in the second configuration, (i) the non-contact surface is bonded along the curved bonding surface, (ii) a virtual line extending from the equator to the equator-side edge of the outermost groove declines monotonically, and (iii) a contact surface side of the cured tread extends in a smooth curve from the equator to the equator-side edge of the outermost groove to the axially outermost edge of the cured tread.

9. The tire according to claim 8, wherein, in the first configuration, the tread thickness in the width cross section at an outermost side is thinner than the thickness of the width cross section at the equator.

10. The tire according to claim 8, wherein, in the first configuration, the tread thickness in the width cross section at the equator-side edge of the outermost groove is equal to the tread thickness at the outermost side of the tread.

11. The tire according to claim 8, wherein, in the first configuration, the tread thickness in the width cross section at the equator-side edge of the outermost groove is thicker than the tread thickness at the outer edge of the outermost groove.

12. The tire according to claim 8, wherein, in the first configuration, the tread thickness in the width cross section gradually decreases in a curve from the equator to the equator-side edge of the outermost groove located at an outermost position in the width direction.

13. The tire according to claim 8, wherein, in the second configuration, a ground contact length of the contact surface is greater at the equator than at the equator-side edge and the axially outermost edge.

* * * * *